US010701710B2

(12) United States Patent
Lin

(10) Patent No.: US 10,701,710 B2
(45) Date of Patent: Jun. 30, 2020

(54) METHOD AND APPARATUS FOR MULTIPLEXING TRANSMISSIONS FOR DIFFERENT SERVICES IN A WIRELESS COMMUNICATION SYSTEM

(71) Applicant: ASUSTeK COMPUTER INC., Taipei (TW)

(72) Inventor: Ko-Chiang Lin, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 3 days.

(21) Appl. No.: 15/851,994

(22) Filed: Dec. 22, 2017

(65) Prior Publication Data

US 2018/0184440 A1 Jun. 28, 2018

Related U.S. Application Data

(60) Provisional application No. 62/438,802, filed on Dec. 23, 2016.

(51) Int. Cl.
*H04W 4/00* (2018.01)
*H04W 72/12* (2009.01)
(Continued)

(52) U.S. Cl.
CPC ......... *H04W 72/12* (2013.01); *H04W 52/146* (2013.01); *H04W 52/247* (2013.01); *H04W 52/346* (2013.01); *H04W 72/0413* (2013.01); *H04W 72/0473* (2013.01); *H04W 76/27* (2018.02); *H04W 52/248* (2013.01); *H04W 88/02* (2013.01)

(58) Field of Classification Search
CPC . H04W 72/12; H04W 72/0413; H04W 76/27; H04W 52/146; H04W 52/247; H04W 52/346; H04W 7/0473
USPC ........................................................ 370/329
See application file for complete search history.

(56) References Cited

U.S. PATENT DOCUMENTS 7,454,225 B2   11/2008  Ozarow
9,198,071 B2 *  11/2015  Geirhofer ............. H04L 1/0026
(Continued)

FOREIGN PATENT DOCUMENTS

CN       106255213 A    12/2016
JP       2012-231267 A  11/2012
(Continued)

OTHER PUBLICATIONS

Huawei, UL URLLC Multiplexing Considerations, 3GPP TSG RAN WG1 Meeting 87, R1-1611657, Nov. 18, 2016, 6 pages.
(Continued)

*Primary Examiner* — Thai D Hoang
(74) *Attorney, Agent, or Firm* — Christensen, Fonder, Dardi & Herbert PLLC

(57) ABSTRACT

Method and apparatus for uplink transmission for a user equipment (UE) (e.g. mobile phone) in a wireless communication system are disclosed herein. The UE is scheduled to perform a transmission for a channel on a scheduled resource. If the scheduled resource overlaps with a configured resource for the UE, the UE transmits on the non-overlapping portion of the scheduled resource at the UE's regular transmission power level and transmits on the overlapping portion of the scheduled resource at a lower transmission power level.

14 Claims, 15 Drawing Sheets

(51) Int. Cl.

| | |
|---|---|
| *H04W 52/14* | (2009.01) |
| *H04W 52/24* | (2009.01) |
| *H04W 52/34* | (2009.01) |
| *H04W 76/27* | (2018.01) |
| *H04W 72/04* | (2009.01) |
| *H04W 88/02* | (2009.01) |

(56) References Cited

U.S. PATENT DOCUMENTS

| | | | |
|---|---|---|---|
| 9,629,094 | B2 | 4/2017 | Damnjanovic |
| 9,794,026 | B2* | 10/2017 | Barbieri ............... H04L 5/0032 |
| 2008/0207150 | A1 | 8/2008 | Malladi |
| 2014/0050205 | A1* | 2/2014 | Ahn .................... H04W 52/146 370/336 |
| 2014/0177531 | A1* | 6/2014 | Imamura ............... H04W 24/10 370/328 |
| 2015/0085677 | A1* | 3/2015 | Pourahmadi .......... H04L 5/0041 370/252 |
| 2016/0165547 | A1* | 6/2016 | Ouchi ................. H04W 52/146 455/522 |
| 2017/0111919 | A1* | 4/2017 | Madan .............. H04W 72/1273 |
| 2017/0142665 | A1* | 5/2017 | Tabet ................. H04W 52/241 |
| 2017/0290046 | A1* | 10/2017 | Sun .................... H04W 74/006 |
| 2017/0295589 | A1* | 10/2017 | Sundararajan .... H04W 72/1278 |
| 2017/0331662 | A1* | 11/2017 | Sun ....................... H04L 5/0073 |
| 2017/0367087 | A1* | 12/2017 | Seo ...................... H04W 72/02 |
| 2018/0054339 | A1* | 2/2018 | Sun .................... H04W 52/346 |
| 2018/0103385 | A1* | 4/2018 | Zhu .................... H04W 52/325 |
| 2018/0103485 | A1* | 4/2018 | Jiang ....................... H04W 8/22 |
| 2018/0160376 | A1* | 6/2018 | Hwang ............... H04W 52/146 |

FOREIGN PATENT DOCUMENTS

| | | |
|---|---|---|
| WO | WO 2012/147494 A1 | 11/2012 |
| WO | 2016128052 | 8/2016 |

OTHER PUBLICATIONS

Taiwanese Office Action and Search Report for Taiwanese Patent Application No. 106145435 dated Sep. 18, 2018, 9 pages (including English translation).

Huawei, Hisilicon, UL URLLC Multiplexing Considerations, 3GPP TSG RAN WG1 Meeting 87, R1-1611657, Nov. 14-18, 2016, 8 pages, Reno, USA.

Japanese Office Action dated Dec. 11, 2018 for Japanese Application No. 2017-245662, 7 pages.

Huawei et al., R1-1611657, UL URLLC Multiplexing Considerations, 3GPP TSG RAN WG1 #87, 3GPP, Server Publication Date (Nov. 5, 2016).

Korean Office Action dated Jun. 19, 2019 for Application No. 10-2017-0178391, 10 pages.

Huawei, HiSILICON, "UL URLLC Multiplexing Considerations, 3GPP TSG RAN WG1 Meeting #87", Nov. 14-18, 2016 (8 pages).

European Search Report for European Application No. 17209940.0 dated Apr. 30, 2018, 11 pages.

Huawei, Hisilicon, "UL URLCC Multiplexing Considerations," 3GPP Draft; $3^{rd}$ Generation Partnership Project (3GPP); TSG RAN WG1 Meeting #87, Document for Discussion and Decision, Document R1-1611647, Reno, USA, Nov. 14-18, 2016 (6 pgs.). Internet URL: http://www.3gpp.org/ftp/Meetings_3GPP_SYNC/RAN1/Docs/, Section 2.

Samsung, "Evaluation Results of Superposition for Multiplexing eMBB and URLLC," $3^{rd}$ Generation Partnership Project (3GPP); TSG RAN WG1 Meeting #87, Document for Discussion and Decision, Document R1-1612537, Reno, USA, Nov. 14-18, 2016 (5 pgs.). Internet URL: http://www.3gpp.org/ftp/tsg_ran/WG1_RL1/TSGR1_87/Docs/, Sections 2.1 and 2.2.

Intel Corporation, "Considerations on NR RRM with the flexible numerologies," 3GPP Draft; $3^{rd}$ Generation Partnership Project (3GPP); TSG-RAN WG4 Meeting #81, Document for Discussion, Document R4-1609074, Reno, USA, Nov. 14-18, 2016 (9 pgs.). Internet URL: http://www.3gpp.org/ftp/Meetings_3GPP_SYNC/RAN4/Docs/.

* cited by examiner

METHOD AND APPARATUS FOR MULTIPLEXING TRANSMISSIONS FOR DIFFERENT SERVICES IN A WIRELESS COMMUNICATION SYSTEM

CROSS-REFERENCE TO RELATED APPLICATIONS

This application claims the benefit of U.S. Provisional Application Ser. No. 62/438,802, filed Dec. 23, 2016, and entitled "Method and Apparatus for Multiplexing Transmissions for Different Services in a Wireless Communication System," the entirety of which is expressly incorporated herein by reference.

TECHNICAL FIELD

The subject disclosure relates generally to communications systems, and specifically to multiplexing transmissions for different services in a 5G wireless communications system.

BACKGROUND

The 3rd Generation Partnership Project (3GPP), which provides reference designs and identifies issues that require consideration and solutions for 5G, has identified many unresolved issues related to resource allocation, resource control and transmitting control channel information for 5G systems. Inventions presented in the subject disclosure provide numerous solutions to those issues, including, for example, management of uplink (UL) resources.

BRIEF DESCRIPTION OF THE DRAWINGS

Various non-limiting embodiments are further described with reference to the accompanying drawings in which.

DETAILED DESCRIPTION

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details, and without limiting them to particular network environment(s) or standard(s).

Figure 1:
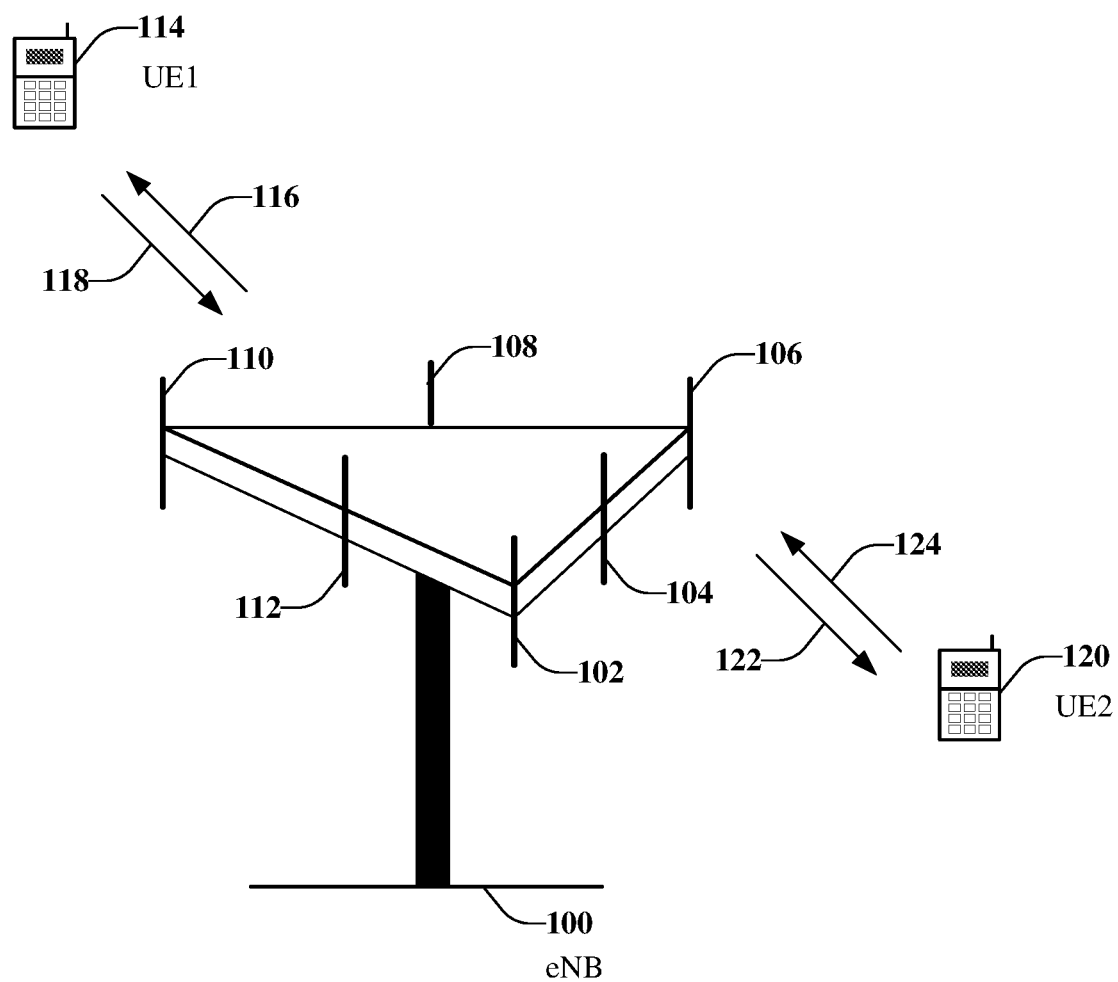
FIG. 1 illustrates a multiple access wireless communications system compliant with the LTE standard.

Referring initially to FIG. 1, illustrated is an example, non-limiting wireless communications system, including mobile devices (or UEs) 114 and 120, and a network node 100. User equipment or mobile device UE1 114 and UE2 120 can be in communication with a network node 100 (e.g., an eNodeB, eNB, network, cell, or other terminology). Antennas 102, 104, 106, 108, 110, and 112 transmit and receive communications between network node 100 and mobile devices, including UE1 114 and UE2 120. As illustrated, UE1 114 and UE2 120 communicate with network node 100 pursuant to the Long-Term Evolution (LTE, also referred to as 4G) standard, as specified in Third Generation Partnership Project (3GPP) Release 8 (December 2008) and subsequent releases. Further, UE1 114 and UE2 120 and/or the network node 100 can be in communication with other user equipment or mobile devices (not shown) and/or other network nodes (not shown). A "link" is a communications channel that connects two or more devices or nodes. An uplink (UL) 118 refers to a link used for transmission of signals from UE1 114 to the network node 100. A downlink (DL) 116 refers to a link used for transmission of signals from the network node 100 to UE1 114. UL 124 refers to the link used for the transmission of signals from UE2 120 to the network node 100, and DL 122 refers to the link used for the transmission of signals from the network node 100 to UE2 120.

In its development of 5G, the follow up to LTE, the 3GPP has identified packet data latency as an area for improvement. Packet data latency is an important metric for performance evaluation, and reducing packet data latency results in improved system performance. 3GPP RP-150465 (March 2015), "SI: Study on Latency Reduction Techniques for LTE", which is incorporated by reference here in its entirety, proposes two avenues for further investigation:

"Fast uplink access solutions [RAN2]:
  for active UEs and UEs that have been inactive a longer time, but are kept in RRC Connected, focus should be on reducing user plane latency for the scheduled UL transmission and getting a more resource efficient solution with protocol and signaling enhancements, compared to the pre-scheduling solutions allowed by the standard today, both with and without preserving the current TTI length and processing times;
From RAN #83: TTI shortening and reduced processing times [RAN1]:
  Assess specification impact and study feasibility and performance of TTI lengths between 0.5 ms and one OFDM symbol, taking into account impact on reference signals and physical layer control signaling"

TTI shortening and processing time reduction can be considered an effective solution for reducing latency, as the time unit for transmission can be reduced, e.g., from 1 milliseconds (ms) (14 OFDM symbols) to 1-7 OFDM symbols, and the delay caused by decoding can be reduced as well. Another benefit to shortening TTI is to support a finer granularity for transport block (TB) size, such that unnecessary padding be reduced. However, reducing TTI length may impact system design, as the physical channels for current systems are based on a 1 ms structure.

Numerology refers to the particular values that are selected for parameters such as subcarrier spacing, symbol times, Fast Fourier Transform (FFT) sizes, etc. for performing orthogonal frequency division multiplexing (OFDM). That is the case in some LTE complaint mobile phones, wherein only one downlink (DL) numerology is defined for initial access. Specifically, the numerology is defined to include a 15-kHz subcarrier spacing and the signal and channel to be acquired during initial access are based on 15 kHz numerology. The OFDM symbols are grouped into resource blocks. If the resource blocks have a total size of 180 kHz spacing in the frequency domain, for example, then at 15 kHz sub-spacing there would be 12 subcarriers. In time domain, each resource block would have the length of 1 millisecond and thus each 1 millisecond transmission time interval (TTI) would transmit two slots (Tslots) of OFDM symbols.

An overview of LTE numerology and descriptions of the OFDM slots, uplink and downlink channels, and control channels are described in 3GPP TS 36.211 v. 13.1.0, "3$^{rd}$ Generation Partnership Project; Technical Specification Group Radio Access Network; Evolved Universal Terrestrial Access (E-UTRA); Physical channels and modulation (Release 13)" (March 2016), which is incorporated by reference here in its entirety.

The frame structure for the New RAT (NR) in 5G should accommodate various requirements for time and frequency resources, e.g., from ultra-low latency (~0.5 ms) to delay tolerant machine-type communications (MTC), and from a high peak rate for enhanced Mobile Broadband (eMBB) to a very low data rate for MTC. An important consideration is low latency, e.g., short TTI, while accounting for mixing or adapting TTIs of different lengths. In addition to accommodating diverse services and requirements, forward compatibility should be considered in designing NR frame structure, as not all NR features or services may be included in the initial phase or release.

Reducing latency is an important improvement between different generations or releases of a protocol, improving efficiency as well as meeting new applications requirements, e.g., real-time service. An effective method frequently adopted to reduce latency is to reduce the length of TTIs, from 10 ms in 3G to 1 ms in LTE. In the context of LTE-A Pro contemplated in 3GPP Release 14, the TTI was proposed to be reduced to a sub-ms level, e.g., 0.1-0.5 ms, by reducing the number of OFDM symbols within a TTI, without changing any existing LTE numerology. It should be noted that LTE supports only one numerology. This proposed improvement could address TCP slow start issues, extremely low bandwidth but frequent traffic, or to accommodate to some extent ultra-low latency in NR. Processing time reduction is another consideration in reducing latency, although it has not yet been conclusively shown that short TTI is always associated with short processing time.

In LTE, there is only one DL numerology defined for initial access, which is 15 KHz subcarrier spacing and the signal and channel to be acquired during initial access is based on 15 KHz numerology. To access a cell, a UE may need to acquire some fundamental information. For example, a UE first acquires time/frequency synchronization of a cell, which is done during cell search or cell selection/reselection. The time/frequency synchronization can be obtained by receiving a synchronization signal, such as the primary synchronization signal (PSS)/secondary synchronization signal (SSS). During synchronization, the center frequency of a cell and the subframe/frame boundary are obtained by the UE. Also, the cyclic prefix (CP) of the cell, e.g., normal CP or extended CP, and duplex mode of the cell, e.g., FDD or TDD can be known/learned from the PSS/SSS. The master information block (MIB), which is carried on physical broadcast channel (PBCH) is received, includes some fundamental system information, about the cell, e.g., system frame number (SFN), system bandwidth, physical control channel (e.g. PHICH/PDCCH), and related information. The DL control channel (e.g. PDCCH) provides information on proper resource elements and proper payload size according to the system bandwidth. Moreover, the UE may acquire more system information required to access the cell in the system information block (SIB), such as whether the cell can be accessed, uplink (UL) bandwidth and frequency, random access parameter(s), etc.

The LTE standard also provides for uplink power control. A UE estimates proper transmission power based on several factors, e.g., transmission bandwidth, pathloss, and commands from the base station/network cell. The transmission power for a specific channel or signal, e.g., UL data channel, would be applied to a scheduling unit/TTI, e.g., a 1 ms subframe. An overview of uplink power control and transmission is described in 3GPP TS 36.213 v. 13.1.1, "3$^{rd}$ Generation Partnership Project; Technical Specification Group Radio Access Network; Evolved Universal Terrestrial Access (E-UTRA); Physical layer procedures (Release 13)" (March 2016), which is incorporated by reference here in its entirety.

For NR in 5G, backward compatibility is not required, allowing for multiple numerologies to be accommodated. In addition, numerology can be adjusted such that reducing the symbol number of a TTI would not be the only technique to change TTI length. For example, LTE utilizes 14 OFDM symbols in 1 ms, and a subcarrier spacing of 15 kHz. If subcarrier spacing is changed to 30 kHz, assuming same FFT size and CP structure, then 28 OFDM symbols would be contained in 1 ms. Equivalently, the TTI would be reduced to 0.5 ms if the number of OFDM symbols in a TTI is kept the same as in LTE. Thus, the design for TTI lengths can be kept across different TTI lengths, with scalability for subcarrier spacing. In determining subcarrier spacing, considerations include FFT size, physical resource block (PRB) definition/number, CP design, and supportable system bandwidth. As NR will provide for larger system bandwidth and larger coherence bandwidth, larger subcarrier spacing is possible.

5G will also likely support multiple types of services, with different characteristics and requirements. For example, ultra-reliable and low latency communication (URLLC) is a service type with tight timing/low latency requirements compared to other types of traffic, e.g., eMBB. To meet latency requirements, the TTI/scheduling interval for URLLC needs to be short. One technique to reduce the TTI is to increase subcarrier spacing so as to reduce OFDM symbol length in the time domain. For example, if subcarrier spacing is 15 kHz, a 7 OFDM symbol transmission interval would occupy 0.5 ms. At a subcarrier spacing of 60 kHz, the 7 OFDM symbol transmission interval would occupy 0.125 ms, which better fulfills the stringent timing requirements for URLLC. Another technique is to reduce the number of OFDM symbols within a TTI. For example, if subcarrier spacing is kept at 15 kHz, when the number of OFDM symbols in a TTI is reduced from 14 to 2, the transmission time interval would be reduced from 1 ms to 0.14 ms. The result is thus similar to increasing subcarrier spacing. Both techniques may be used jointly.

In contrast, for eMBB, a reduced transmission interval may not be desired due to issues such as greater control signaling overheard for a given amount of data traffic, shorter/more frequent control channel reception interval (resulting in increased power consumption), and shorter processing time (more complexity). It is therefore anticipated that a 5G communication system will operate with different TTIs for different services/UEs. Time slots and mini-slots are contemplated to accommodate the different TTIs.

Figure 2:
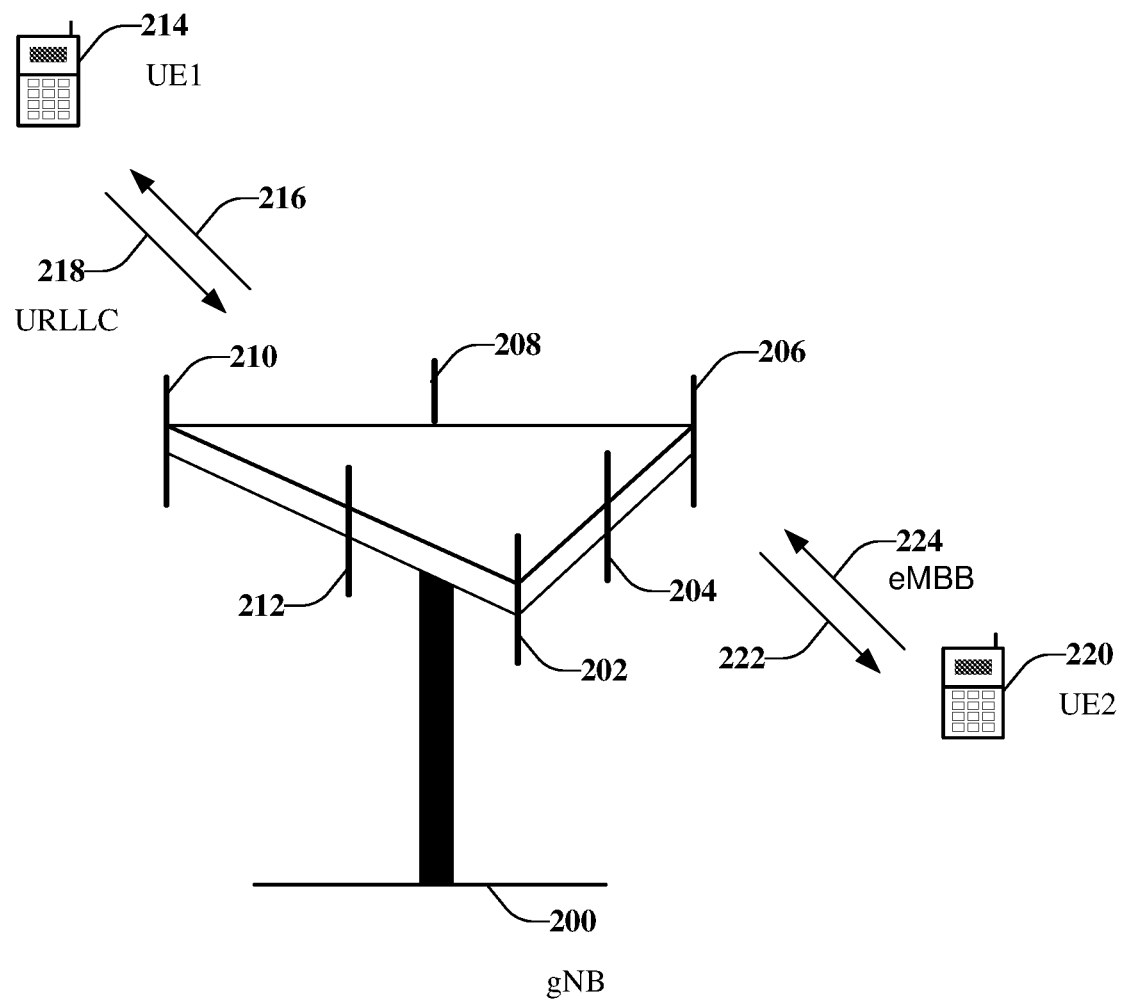
FIG. 2 illustrates an example, non-limiting multiple access wireless communications system, in accordance with one or more embodiments described herein.

Turning to FIG. 2, illustrated is an example, non-limiting wireless communications system for transmission of multiple traffic types, in accordance with one or more embodiments described herein. UE1 214, UE2 220, and network node 200 (e.g., gNodeB) are analogous to UE 1 114, UE2 120, and network node 100, respectively, in FIG. 1. Antennas 202, 204, 206, 208, 210, and 212 enable communications between network node 200 and mobile devices, including UE1 214 and UE2 220. UE1 and UE2 receive data from network node 200 through DLs 216 and 222, respectively. As illustrated, UE1 214 transmits URLLC data to network node 200 through UL 218 and UE2 220 transmits eMBB data to network node 200 through UL 224. It is noted that although various aspects are discussed with respect to two mobile devices and a single network node, the various aspects discussed herein can be applied to one or more mobile devices and/or one or more network nodes It is appreciated that in view of the different timing requirements for different services, a need exists to multiplex data transmissions to maximize bandwidth efficiency. While it is possible to reserve UL resources for certain types of traffic for immediate transmission, e.g., URLLC, predicting the amount of UL resources that needs to be reserved is difficult. Reservation of excessive UL resources would result in wasteful allocation of unutilized UL resources. However, if a UL resource is shared among UEs using different traffic types, e.g., URLLC and eMBB, due to their differing transmission intervals, it is possible that URLLC traffic will require transmission while eMBB traffic has already been scheduled for the UL resource. One technique to avoid collision while not delaying URLLC traffic is to indicate to the UE2 220, which is transmitting eMBB data, to cease transmission on a certain portion of a scheduled UL resource, and to permit the URLLC data transmitted from UE1 214 to occupy that portion. Doing so would require a new signal that UE2 220 would need to monitor more frequently (i.e., at intervals shorter than the eMBB TTI). Moreover, the quality of the eMBB data transmitted would be damaged, as a portion of the UL resource would be punctured and the overall code rate would increase. Finally, if the signal is not detected by UE2 220, UE2 220 would continue transmission and interfere with the URLLC data traffic from UE1 214.

According to an aspect of the present disclosure, collisions may be avoided by allowing a UE to vary the transmission power for a scheduled UL resource. The UE may reduce transmission power for a portion of the scheduled UL resource, e.g. for eMBB data traffic, and transmit at a different power for another portion of the scheduled UL resource. Accordingly, the UE does not need to cease transmission nor to monitor a new signal to allow another UE to utilize a portion of the scheduled UL resource for transmission of a different data type, e.g., URLLC.

Figure 3:
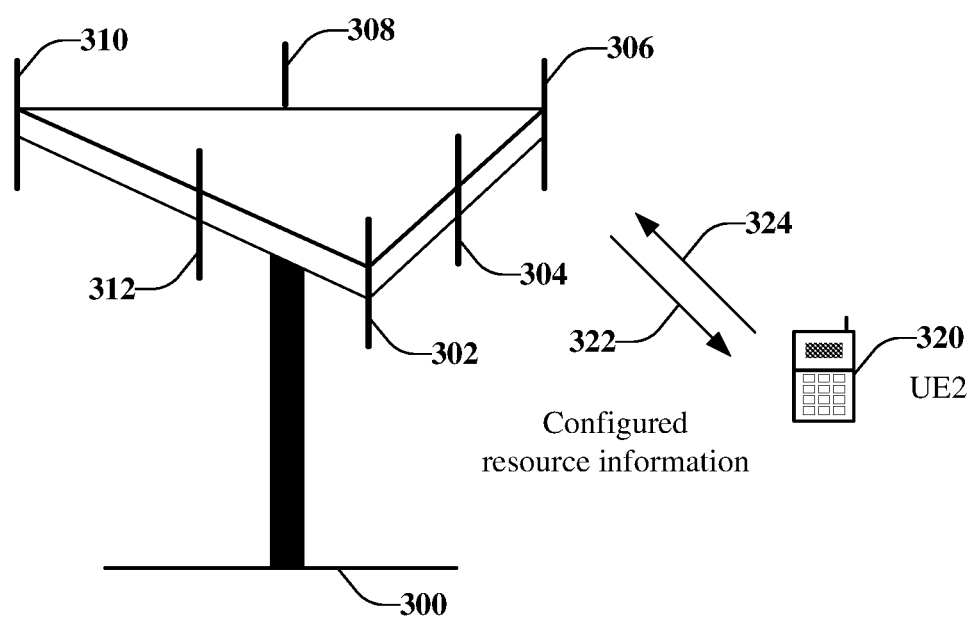
FIG. 3 illustrates an example, non-limiting wireless communications system for transmitting configured resource information, in accordance with one or more embodiments described herein.

FIG. 3 is an alternative view of FIG. 2, utilizing the same network node 300, antennas 302, 304, 306, 308, 310, and 312, UL 324, DL 322, and UE2 320, which is transmitting data, e.g. for eMBB, on a scheduled resource. In one embodiment, UE2 320 is configured to perform transmission at a reduced transmission power. The information for the configured UL resource where the reduced transmission power is applicable are communicated from network node 300 to UE2 320 through DL 322. The information may be indicated in the form of a broadcast message, a RRC configuration message, a physical control channel, or other means. Information relating to the reduced transmission power may also be communicated, preferably, in the same message, from network node 300 to UE2 320. The information may be expressed as an amount of power reduction (e.g. relative to regular/nominal transmission power), or as a reduced transmission power. The amount of power reduction (or reduced transmission power) may be a fixed or configured value. In one embodiment, UE2 320 would use a reduced power to perform the transmission on an overlapping portion between the scheduled resource and the configured UL resource, and use a regular/nominal transmission power on other part of the scheduled resource which does not overlap with the configured UL resource.

Figure 4A:
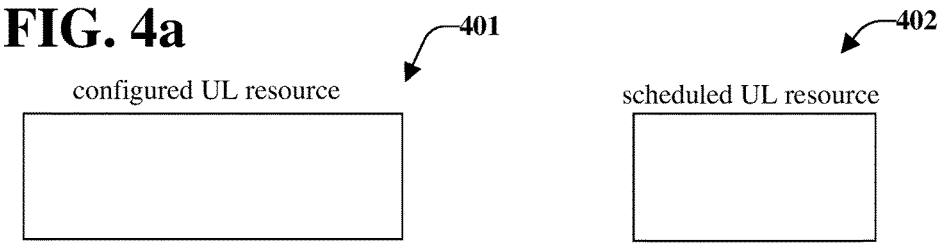
FIGS. 4a-4d illustrate example, non-limiting relationships between a configured UL resource and scheduled UL resource, in accordance with one or more embodiments described herein.

FIGS. 4a-4d illustrate alternative examples of non-limiting scenarios in which a scheduled UL resource may or may not overlap with a configured UL resource. To assist in understanding the figures, the frequency domain corresponds to the y-axis (or height), and the time domain corresponds to the x-axis (or width). In FIG. 4a, the scheduled UL resource 402 does not overlap with the configured UL resource 401 in the time domain, and the scheduled UL resource 402 is transmitted at regular or nominal transmission power of the UE. While there may be some overlap in the frequency domain, that overlap does not affect the timing for the transmission of the scheduled UL resource 402, and need not be considered for purposes of FIG. 4*a*.

Figure 4B:
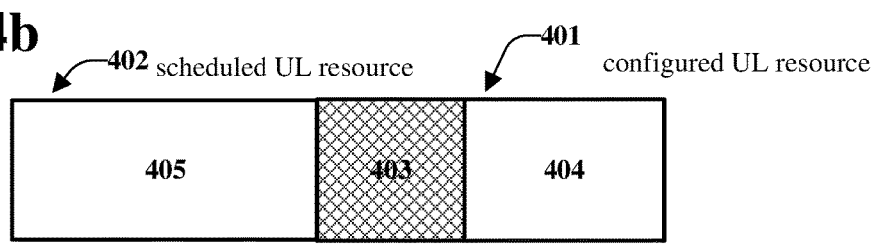

In FIG. 4*b*, the configured UL resource 401 partially overlaps the scheduled UL resource 402 in the time domain and fully overlaps in the frequency domain. Meaning that, for example, some OFDM symbol(s) within the scheduled UL resource 402 are within the configured UL resource 401, and all resource elements associated with those OFDM symbol(s) are also within the configured UL resource 401. As illustrated in FIG. 4*b*, portion 403 corresponds to the portions of configured UL resource 401 and scheduled UL resource 402 that overlap in the time domain (OFDM symbols) and frequency domain (all resource elements for those OFDM symbols). Portion 404 of configured UL resource 401 does not overlap with any portion of scheduled UL resource 402; similarly, portion 405 of scheduled UL resource 402 does not overlap with configured UL resource 401. Where such partial overlap occurs, the UE transmits the overlapping portion 403 of the scheduled UL resource 402 at a reduced transmission power, with the non-overlapping portion 405 transmitted at regular/nominal transmission power.

Figure 4C:
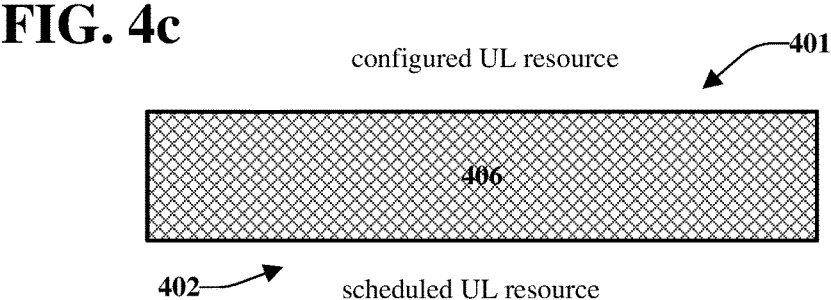

FIG. 4*c* illustrates a full overlap between the configured UL resource 401 and the scheduled UL resource 402 in both the time and frequency domains. The entirety of configured UL resource 401 overlaps with scheduled UL resource 402, as can be understood from overlapping portion 406. In this scenario, the entire scheduled UL resource 402 is transmitted at reduced transmission power.

Figure 4D:
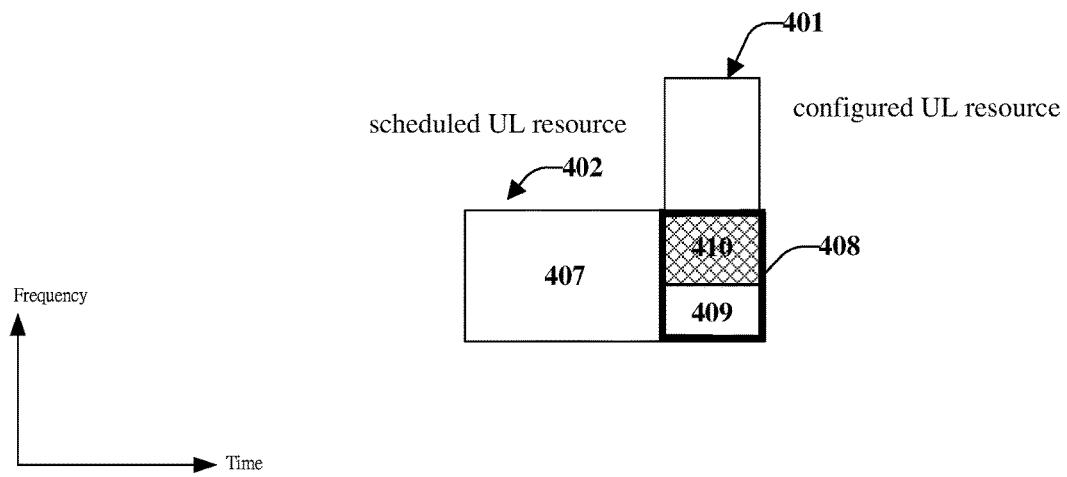

In FIG. 4*d*, the scheduled UL resource overlaps partially with the configured UL resource in the time and frequency domain. In this scenario, some OFDM symbol(s) are within the configured UL resource, and one or more (but not all) resource element(s) associated with those OFDM symbol(s) are within the configured UL resource. As illustrated in FIG. 4*d*, portion 408 of scheduled UL resource 402 overlaps in the time domain with configured UL resource 401, i.e., the OFDM symbols in that portion are identical in both the scheduled resource (e.g., first resource) 402 and configured UL resource (e.g., second resource) 401. However, not all of the resource elements for the OFDM symbols in portion 408 are identical in scheduled UL resource 402 and configured UL resource 401. Configured UL resource 401 and scheduled UL resource 402 overlap in the time domain but not in the frequency domain in portion 409, and overlap in both the frequency and time domains in portion 410. The overlapping resource element(s), i.e., portion 410 of scheduled UL resource 402, may be transmitted at reduced transmission power, and the remaining resource element(s) on the OFDM symbol(s), i.e., portion 409 of scheduled UL resource 402, may be transmitted at regular/nominal transmission power. In addition, portion 407 of scheduled UL resource 402 will be transmitted at regular/nominal power. Alternatively, similarly to FIG. 4*b*, all resource elements for the OFDM symbols in portion 409 of scheduled UL resource 402 may be transmitted at reduced transmission power, and the non-overlapping portion 407 of the scheduled UL resource 402 is transmitted at regular/nominal power.

Figure 5:
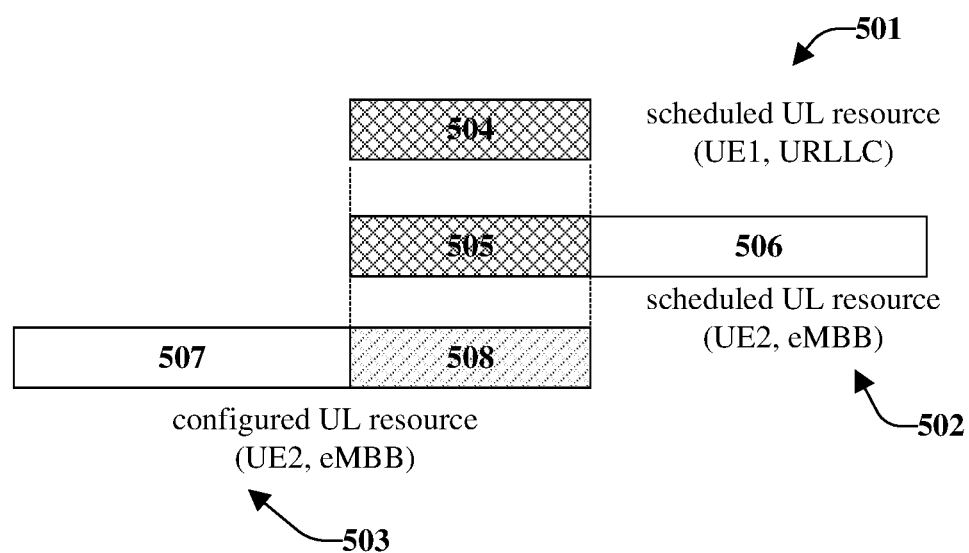
FIG. 5 illustrates an example, non-limiting relationship between scheduled UL resource of two UEs, and a configured UL resource of one of the UEs, in accordance with one or more embodiments described herein.

Turning to FIG. 5, illustrated is an example, non-limiting scenario in which UE1 transmits URLLC data. UE2 220 is scheduled to transmit eMBB data on a scheduled UL resource 502. Portion 505 of the scheduled UL resource 502 for UE2 220 overlaps with portion 508 of a configured UL resource 503, and portion 507 of configured UL resource 503 is not overlapped by any portion of scheduled UL resource 502. Accordingly, UE2 220 will transmit eMBB data at a reduced transmission power for portion 505 of the scheduled UL resource 502, rather than ceasing transmission. During the time which UE2 220 transmits portion 505 of scheduled UL resource 502 at a reduced transmission power, UE1 214 may transmit URLLC data for portion 504 of scheduled UL resource 501 at regular/nominal transmission power. The non-overlapping portion 506 of the scheduled UL resource 502 will be transmitted by UE2 220 at a regular/nominal transmission power. Accordingly, for portion 505 of the scheduled UL resource 502 that overlaps with portion 508 of the configured UL resource 503, transmission of the URLLC data from UE1 214 will dominate over transmission of eMBB data from UE2 220, and network node 200 will receive URLLC data from UE1 214 over UL 218 without collision from eMBB data transmitted from UE2 220 over UL 224. It will be appreciated that transmission at reduced transmission power is not limited to the particular scenario illustrated in FIG. 5. For example, in one embodiment, portion 504 of scheduled UL resource 501, which overlaps with portion 505 of scheduled UL resource 502, may not take up the entirety of scheduled UL resource 501.

Figure 6:
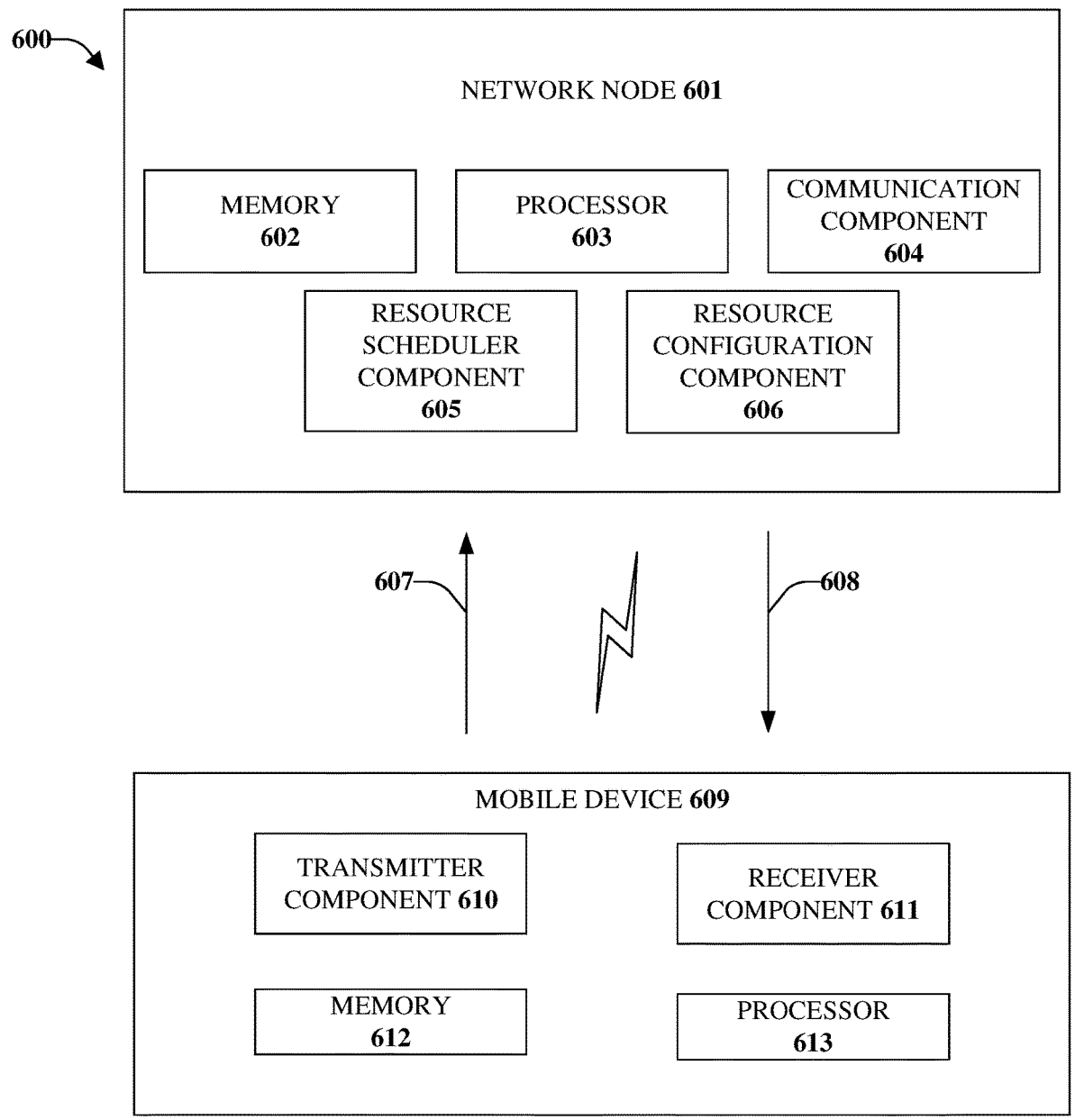
FIG. 6 is an example, non-limiting simplified block diagram of a wireless communication system for transmitting resource schedule information and resource configuration information, in accordance with one or more embodiments described herein.

FIG. 6 illustrates an example, non-limiting wireless communications system 600 including a mobile device (or UE) 609 and a network node 601. Network node 601 can include memory 602, processor 603, communication component 604, resource scheduler component 605, and resource configuration component 606. Communication component 604 can be a transmitter/receiver configured to transmit to and/or receive data from the mobile device 609, other network nodes, and/or other mobile devices. Through the communication component 604, the network node 601 can concurrently transmit and receive data, can transmit and receive data at different times, or combinations thereof. The network node 601 can also comprise a memory 602 operatively coupled to a processor 603. The memory 602 can facilitate action to control communication between the network node 601 and the mobile device 609, such that the non-limiting communications system 600 can employ stored protocols and/or algorithms to achieve improved communications in a wireless network as described herein. Resource scheduler component 605 schedules UL resources for mobile device 609, as described more fully herein. Resource configuration component 606 generates information for configured UL resources. Resource scheduler component 605 and resource configuration component 609 are operatively coupled to communication component 604 to communicate with mobile device 609 through downlink 608. The network node 601 may receive data from mobile device 609 through uplink 607.

The mobile device 609 can include transmitter component 610, receiver component 611, memory 612, and processor 613. Although illustrated and described with respect to separate components, the transmitter component 610 and the receiver component 611 can be a single transmitter/receiver configured to transmit and/or receive data to/from network node 601, other network nodes, and/or other mobile devices. Through the transmitter component 610 and receiver component 611, the mobile device 609 can concurrently transmit and receive data, transmit and receive data at different times, or combinations thereof. Mobile device 609 can also include a memory 612 and processor 613, which may be operatively coupled.

Figure 7:
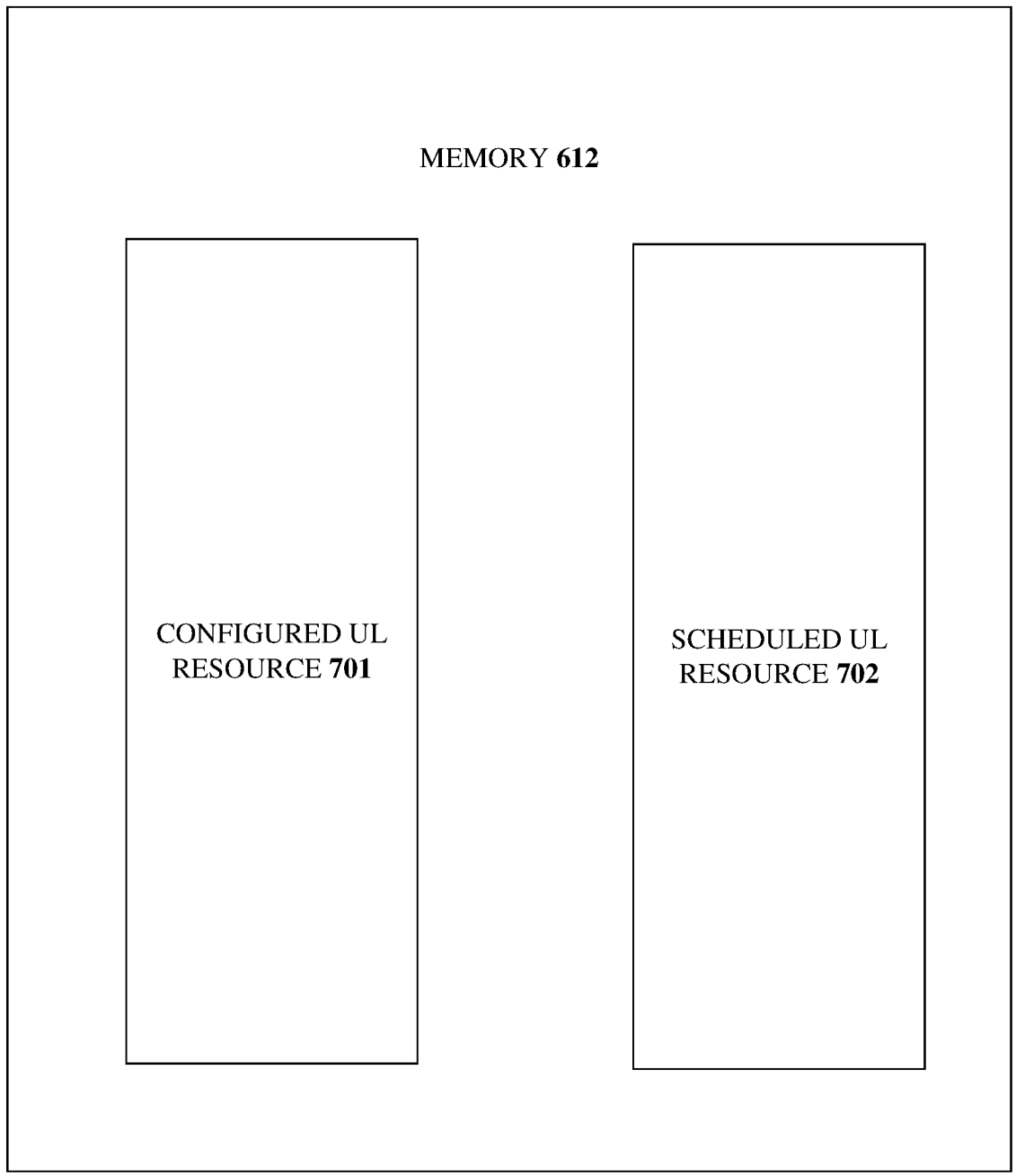
FIG. 7 is an example, non-limiting simplified block diagram of the memory shown in FIG. 6, in which a configured UL resource and a scheduled UL resource are stored, in accordance with one or more embodiments described herein.
Figure 8:
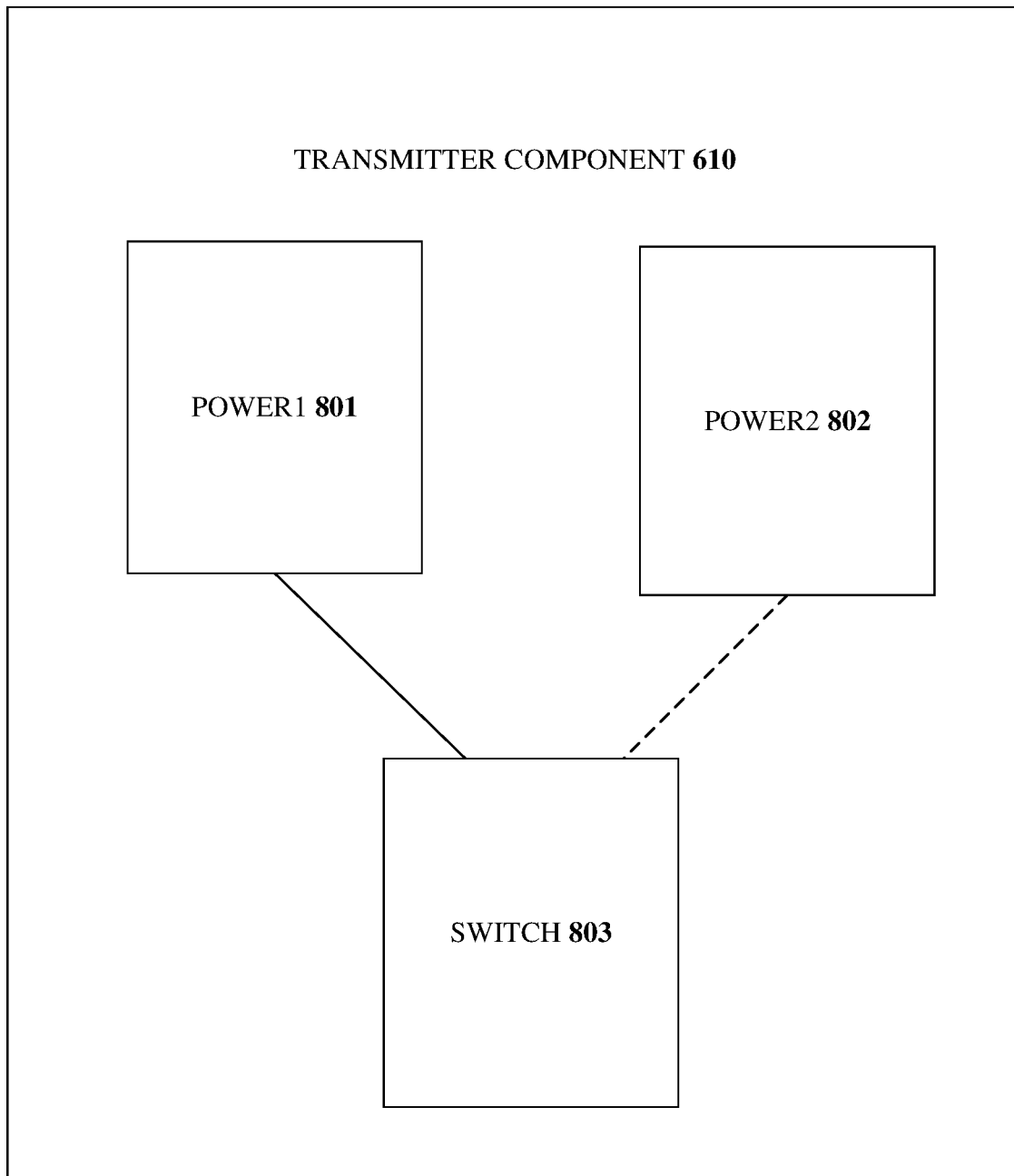
FIG. 8 is an example, non-limiting simplified block diagram of the transmitter component shown in FIG. 6, in which a switch controls transmission at different transmission power levels, in accordance with one or more embodiments described herein.

FIGS. 7 and 8 illustrate examples of non-limiting memory 612 and transmitter component 610, respectively, that were depicted on FIG. 6. Memory 612 stores information relating to configured UL resource 701 and scheduled UL resource 702, communicated from the resource configuration component 606 and resource scheduler component 605 of network node 601. Processor 613, illustrated in FIG. 6, determines the overlap, if any, between configured UL resource 701 and scheduled UL resource 702. The overlapping portion of the scheduled UL resource 702 is transmitted by transmitter component 610 at power1 level 801, and the non-overlapping portion is transmitted at power2 level 802. A switch 803 determines the transmission power level(s) at which portions of the scheduled UL resource 702 are transmitted by transmitter component 610.

Figure 9:
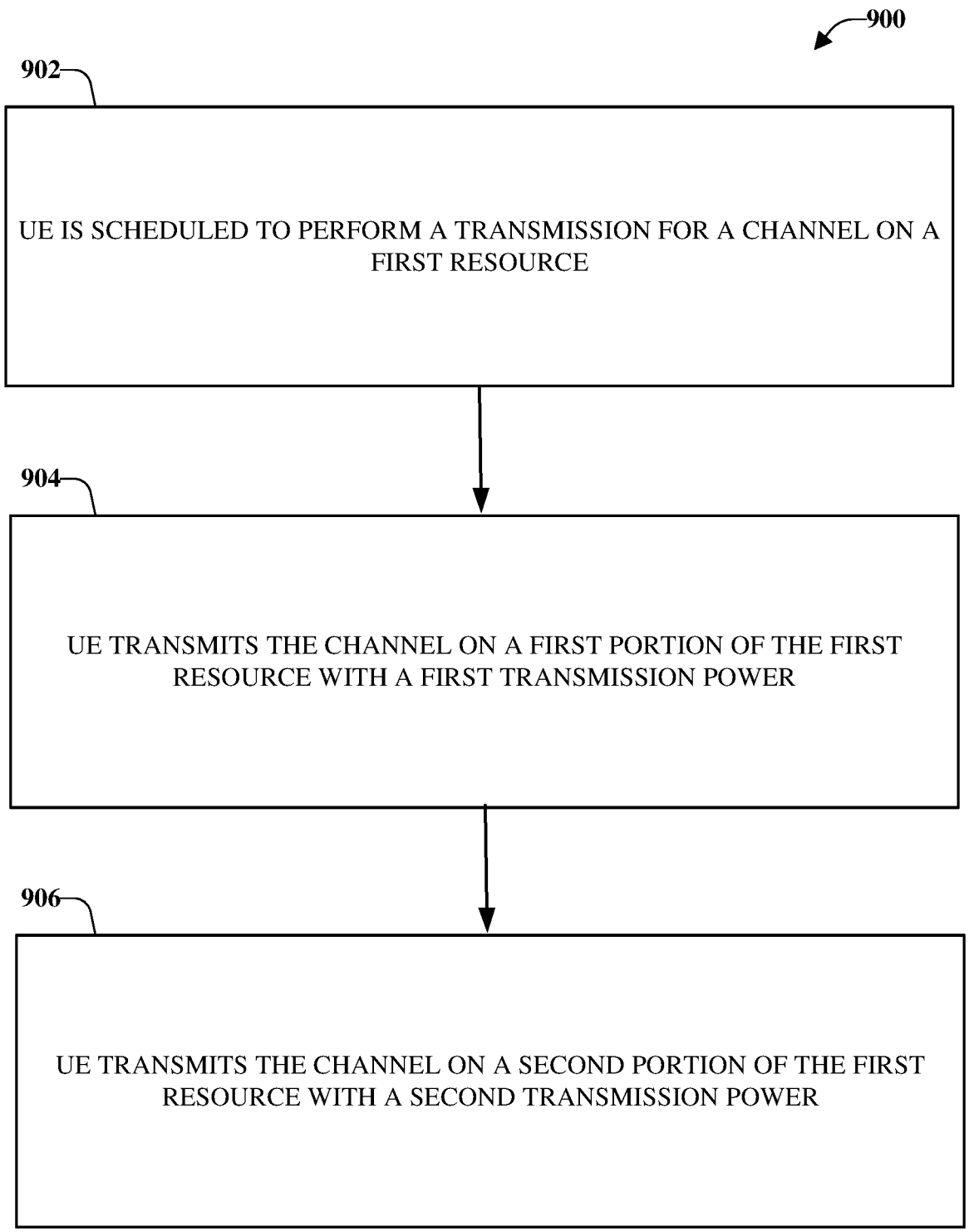
FIG. 9 illustrates an example, non-limiting methodology for transmitting a channel on a first resource, in which the channel on a first portion of the first resource is transmitted with a first transmission power, and the channel on a second portion of the first resource is transmitted with a second transmission power, in accordance with one or more embodiments described herein.

FIG. 9 illustrates an example, non-limiting methodology for transmitting a scheduled UL resource at different transmission powers, according to an aspect of the subject disclosure. As illustrated in the flow diagram 900, at Step 902, the UE is scheduled to perform a transmission for a channel on a first resource. At Step 904, the UE transmits the channel on a first portion of the first resource with a first transmission power, and at Step 906, the UE transmits the channel on a second portion of the first resource with a second transmission power. Preferably, the first portion of the first resource overlaps with a configured UL resource, and is transmitted at a lower transmission power than the second portion of the first resource.

Figure 10:
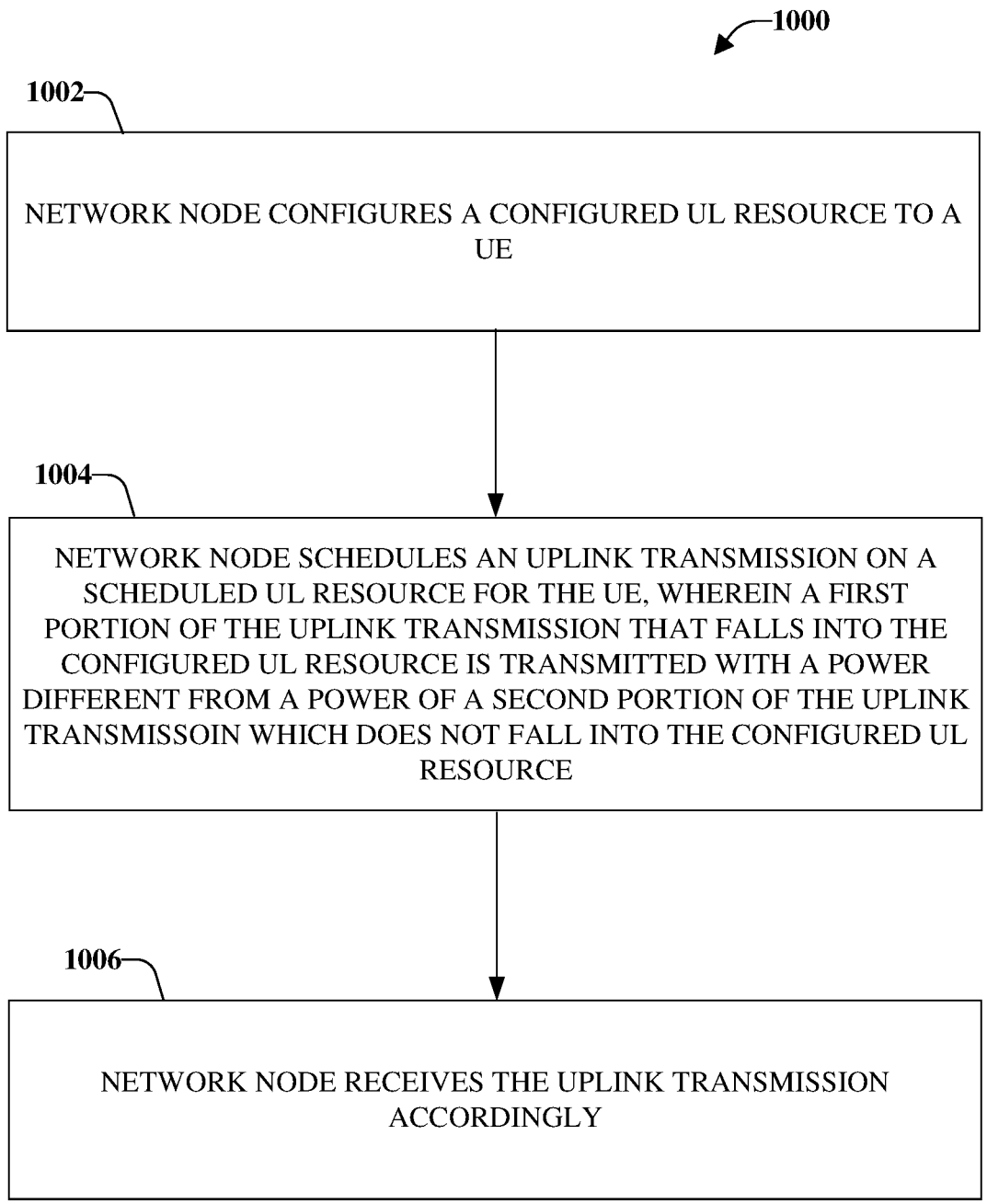
FIG. 10 illustrates an example, non-limiting methodology for performing uplink transmissions at different power transmission levels, according to an aspect of the subject disclosure.

FIG. 10 illustrates an example, non-limiting methodology for scheduling a UL resource, according to an aspect of the subject disclosure. As illustrated in the flow diagram 1000, at Step 1002, a network node configures a configured UL resource (e.g., second resource) to a UE. At Step 1004, the network node schedules an uplink transmission on a scheduled UL resource for the UE, wherein a first portion of the uplink transmission which falls into the configured UL resource is transmitted with a power level different from a power level of a second portion of the uplink transmission which does not fall into the configured UL resource. At Step 1006, the network node receives the uplink transmission accordingly.

The UE preferably uses the same transmission power for all the transmitted resource elements on an OFDM symbol. More specifically, if any resource elements on an OFDM symbol overlap with the configured UL resource, the transmission power on all the transmitted resource elements on the OFDM symbol would be reduced. Alternatively, the UE may use different transmission power for different transmitted resource elements on an OFDM symbol. More specifically, a first transmission power on a first set of transmitted resource elements on the OFDM symbol which overlap with the configured UL resource would be reduced, and a second transmission power on a second set of transmitted resource elements on the OFDM symbol which does not overlap with the configured UL resource would not be reduced.

In a preferred aspect of the subject disclosure, the configured UL resource is one or more OFDM symbol(s). The presence of the configured UL resource can be dynamically indicated to the UE. The length of the scheduled UL resource in the time domain is a TTI/scheduling interval, e.g., one slot. The length of the scheduled UL resource may be one slot, multiple slots, one mini-slot, or multiple mini-slots. Within a TTI/scheduling interval of a scheduled UL resource, the transmission power for a channel/signal on one portion of the scheduled resource may be different from the transmission power with respect to a different portion of the scheduled UL resource. Preferably, the difference in transmission power is not due to the power limitation or power capability of the UE. Preferably, the UE can afford the regular/nominal transmission power on the overlapping portion. In addition, the UE preferably does not transmit any other channel/signal within the TTI/scheduling interval.

Preferably, channel estimation is identical for portions of a scheduled UL resource transmitted at different transmission powers. More specifically, a modulation scheme for the uplink is QPSK. There may or may not be a reference signal for the portion of scheduled UL resource transmitted at reduced transmission power. Channel estimation for the portion transmitted at reduced transmission power may be performed by a reference signal for the portion transmitted at regular/nominal power. Alternatively, channel estimations for the different portions of the scheduled UL resource may be performed differently/independently. In such instances, a modulation scheme for the uplink is QAM with a reference signal for the portion of the scheduled UL resource transmitted at reduced transmission power.

Figure 11:
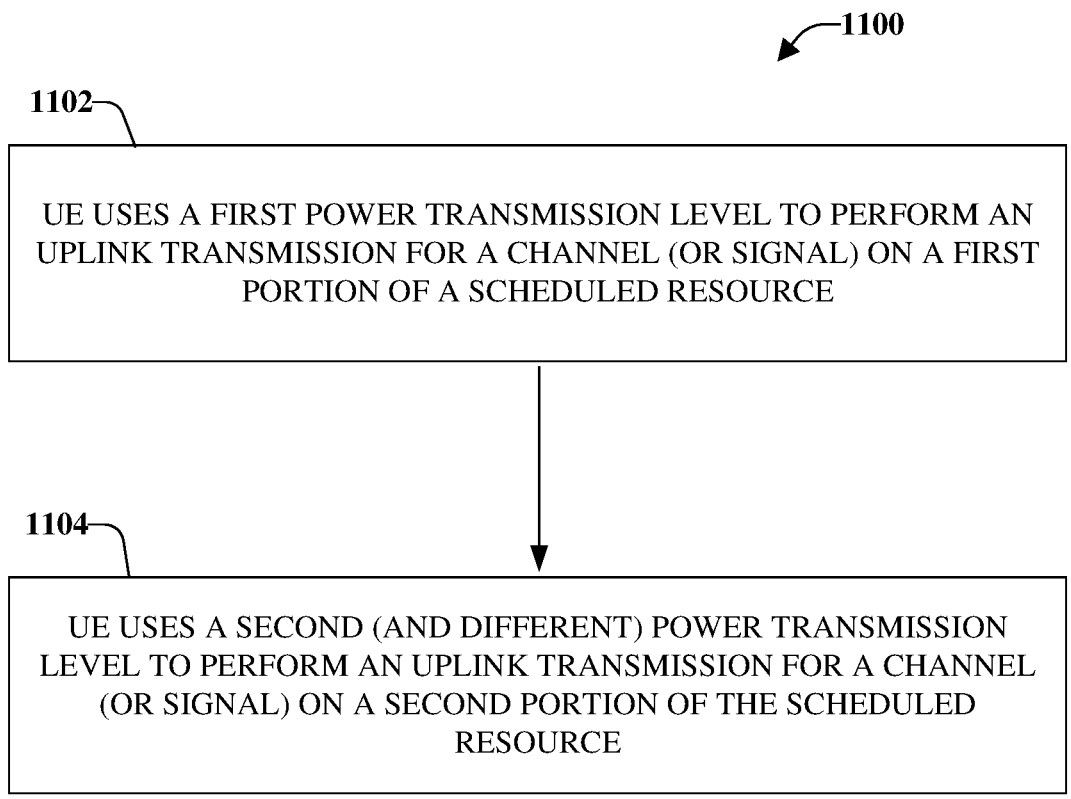
FIG. 11 illustrates an example, non-limiting methodology for performing an uplink, in which the UE uses a first power transmission level for a first portion of a scheduled resource, and a second (and different) power transmission level for a second portion of the scheduled resource, in accordance with one or more embodiments described herein.

FIG. 11 illustrates an example, non-limiting methodology for performing uplink transmissions at different power transmission levels, according to an aspect of the subject disclosure. As illustrated in the flow diagram 1100, at Step 1102, a UE uses a first power transmission level to perform an uplink transmission for a channel (or signal) on a first portion of a scheduled resource (e.g., first resource). At Step 1104, the UE uses a second (and different) power transmission level to perform an uplink transmission for a channel (or signal) on a second portion of the scheduled resource. In one embodiment, the first portion of the scheduled resource falls into a configured UL resource and the second portion of the scheduled resource does not fall into the configured UL resource.

Figure 12:
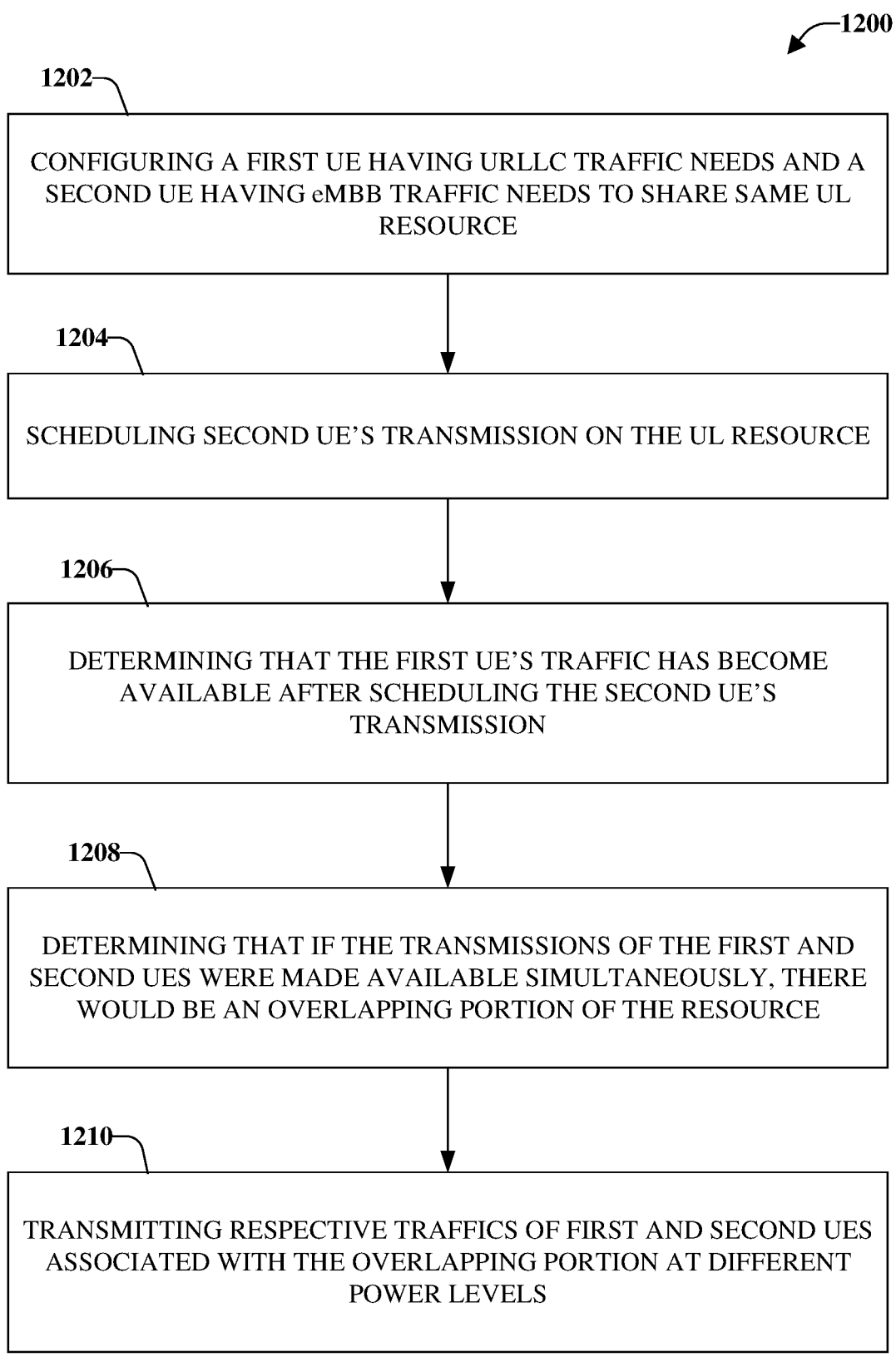
FIG. 12 illustrates an example, non-limiting methodology for transmitting traffic from two UEs, in which respective traffic of the first and second UEs are transmitted at different power levels, in accordance with one or more embodiments described herein.

FIG. 12 illustrates an example, non-limiting methodology for sharing a UL resource by a UE having URLLC traffic needs and a UE having eMBB traffic needs. As illustrated in the flow diagram 1200, Step 1202 comprises configuring a first UE having URLLC traffic needs and a second UE having eMBB traffic needs to share a same UL resource. Step 1204 comprises scheduling the second UE's transmission on the UL resource. Step 1206 comprises determining that the first UE's traffic has become available after scheduling the second UE's transmission. Step 1208 comprises determining that, if the transmissions of the first and second UE's were made simultaneously, there would be an overlapping portion of the resource. Finally, Step 1210 comprises transmitting respective traffics of the first and second UEs associated with the overlapping portion at different power levels.

Figure 13:
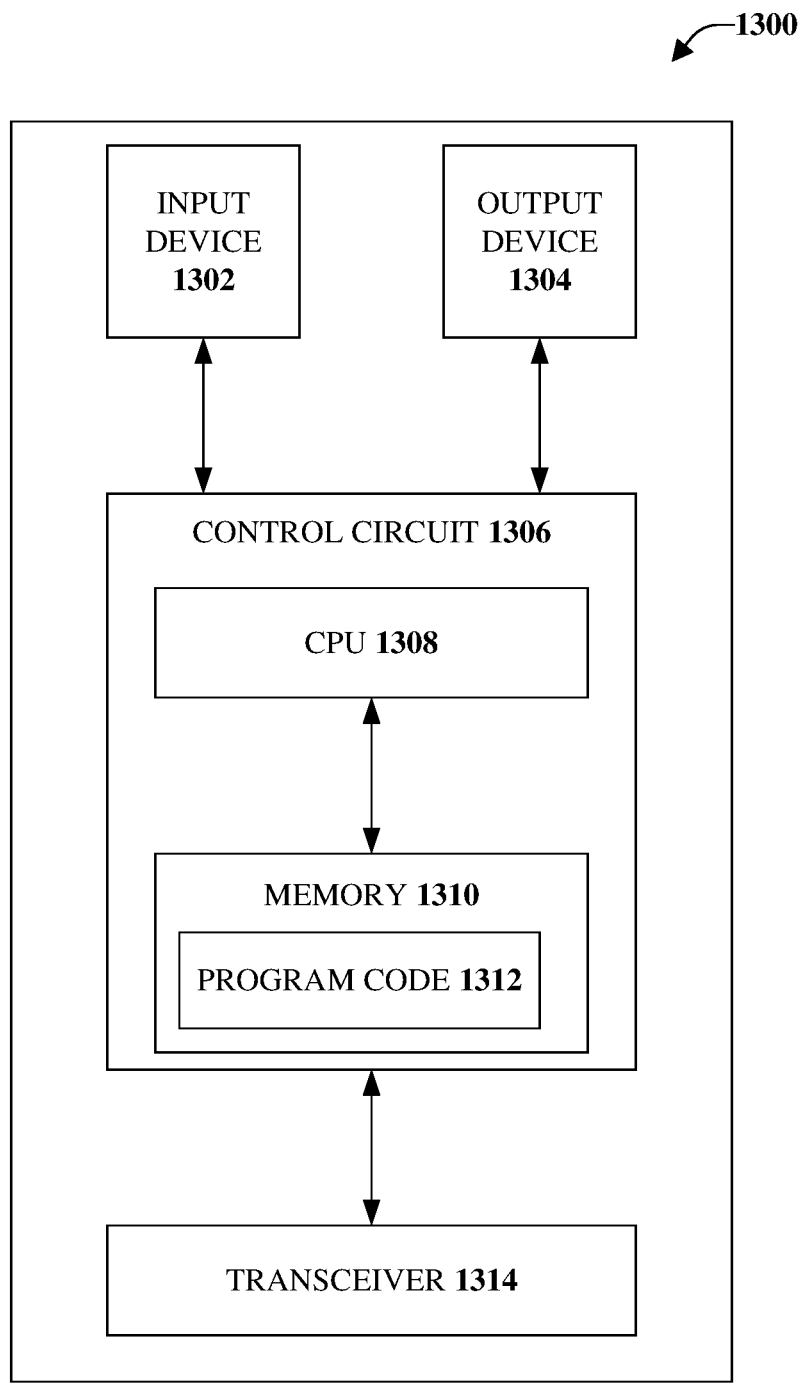
FIG. 13 illustrates an alternative simplified block diagram of a communication device, in accordance with one or more embodiments described herein.

Turning to FIG. 13, illustrated is an alternative simplified functional block diagram of a communication device 1300 in accordance with one or more embodiments described herein. As illustrated in FIG. 13, the communication device 1300 in a wireless communication system can be utilized for realizing the mobile devices (or UEs) 214 and 220 in FIG. 2, and the wireless communications system can be a 5G system. The communication device 1300 can include an input device 1302, an output device 1304, a control circuit 1306, a central processing unit (CPU) 1308, a memory 1310, a program code 1312, and a transceiver 1314. The control circuit 1306 executes the program code 1312 in the memory 1310 through the CPU 1308, thereby controlling an operation of the communications device 1300. The program code 1312 can be executed to perform the techniques illustrated in FIGS. 4-12. The communications device 1300 can receive signals input by a user through the input device 1302, such as a keyboard or keypad, and can output images and sounds through the output device 1304, such as a monitor or speakers. The transceiver 1314 is used to receive and transmit wireless signals, delivering received signals to the control circuit 1306, and outputting signals generated by the control circuit 1306 wirelessly. A device similar to the communication device 1300 in a wireless communication system can also be utilized for realizing the network node 200 in FIG. 2.

Figure 14:
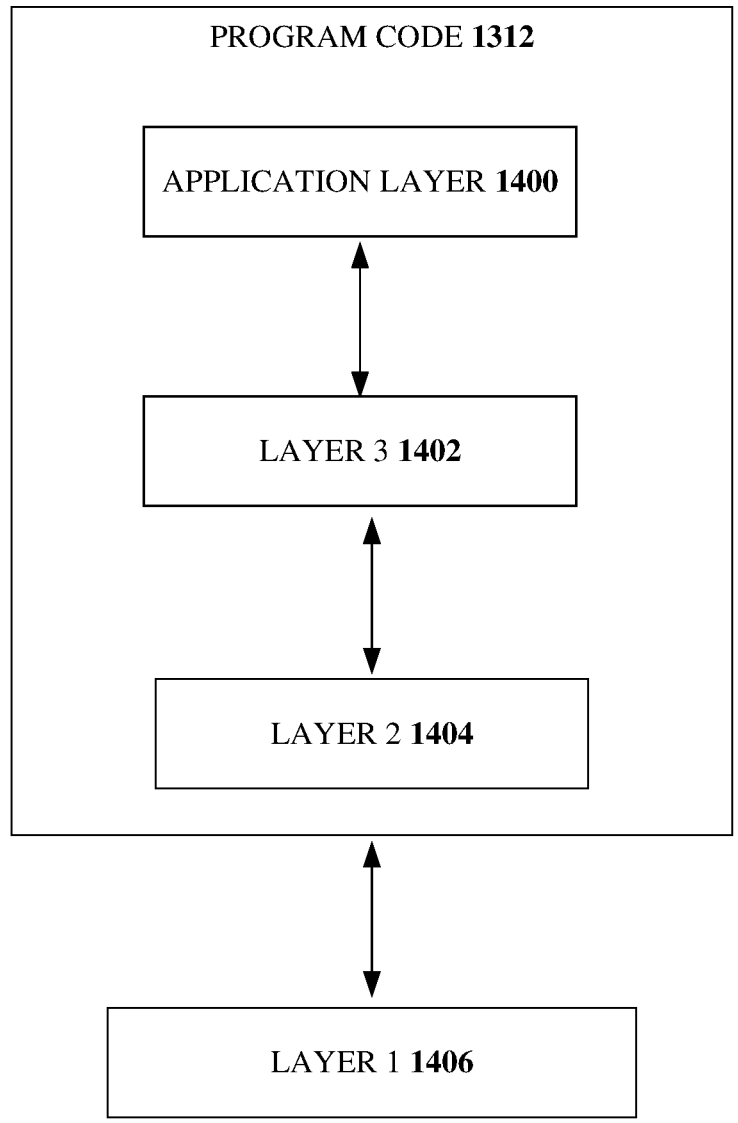
FIG. 14 illustrates a simplified block diagram of the program code shown in FIG. 13, in accordance with one or more embodiments described herein.

FIG. 14 is a simplified block diagram of the program code 1312 shown in FIG. 13, in accordance with one or more embodiments described herein. In this embodiment, the program code 1312 includes an application layer 1400, a Layer 3 portion 1402, and a Layer 2 portion 1404, and is coupled to a Layer 1 portion 1406. The Layer 3 portion 1402 generally performs radio resource control. The Layer 2 portion 1404 generally performs link control. The Layer 1 portion 1406 generally performs physical connections. For a 5G system, the Layer 2 portion 1404 may include a Radio Link Control (RLC) layer and a Medium Access Control (MAC) layer. The Layer 3 portion 1402 may include a Radio Resource Control (RRC) layer.

Figure 15:
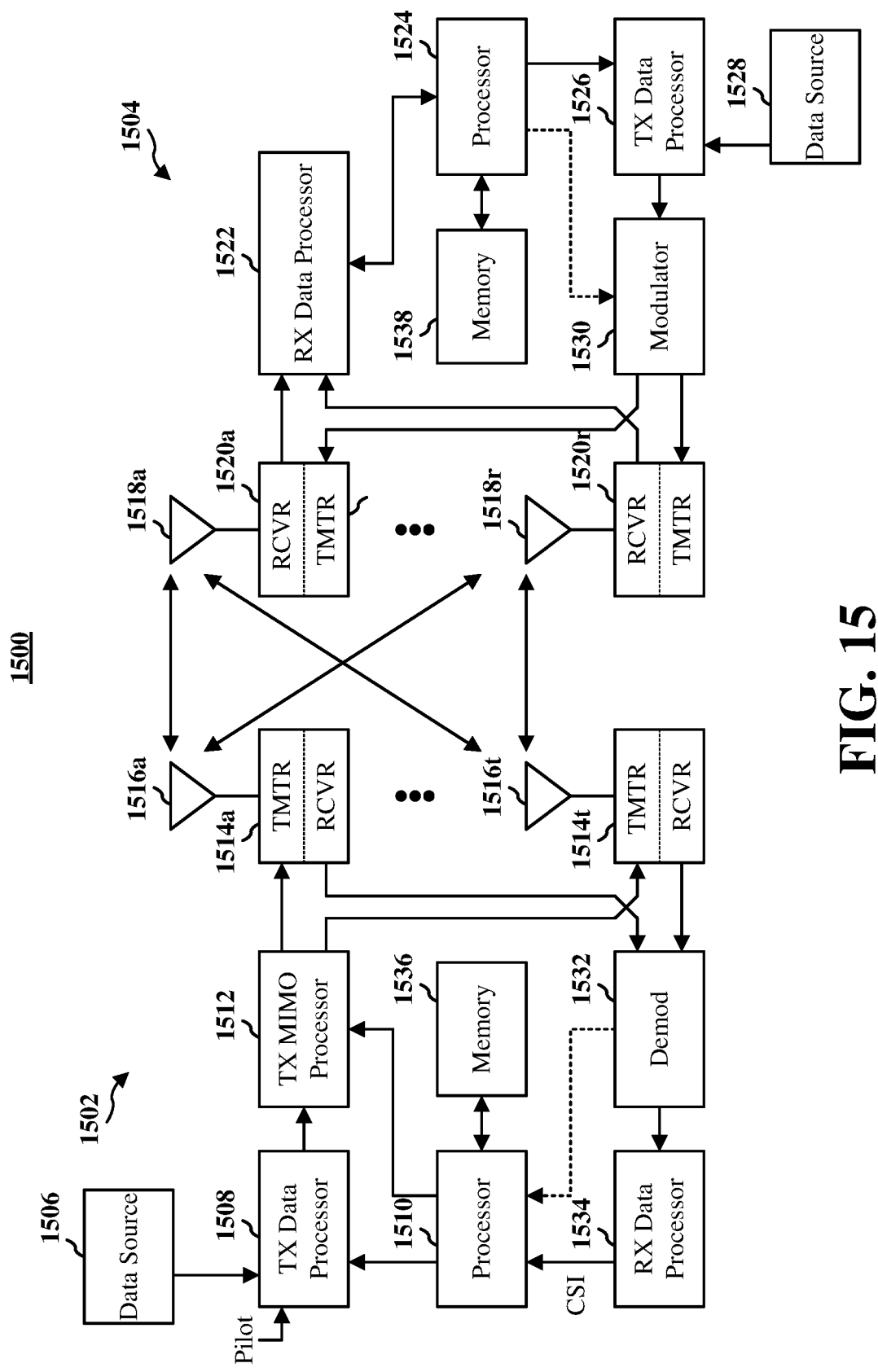
FIG. 15 illustrates a simplified block diagram of an embodiment of a wireless communications system that includes a transmitter system and a receiver system, in accordance with one or more embodiments described herein.

FIG. 15 illustrates a simplified block diagram of an embodiment a MIMO system 1500 that includes of a transmitter system 1502 (also known as the access network) and a receiver 1504 (also known as user equipment (UE)) in accordance with one or more embodiments described herein. At the transmitter system 1502, traffic data for a number of data streams is provided from a data source 1506 to a transmit (TX) data processor 1508.

In one embodiment, each data stream is transmitted over a respective transmit antenna. TX data processor 1508 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 1510.

The modulation symbols for all data streams are then provided to a TX MIMO processor 1512, which may further process the modulation symbols (e.g., for OFDM). TX MIMO processor 1512 then provides $N_T$ modulation symbol streams to $N_T$ transmitters (TMTR) 1514a through 1514t. In certain embodiments, TX MIMO processor 1512 applies beamforming weights to the symbols of the data streams and to the antenna from which the symbol is being transmitted.

Each transmitter 1514 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 1514a through 1514t are then transmitted from $N_T$ antennas 1516a through 1516t, respectively. At receiver system 1504, the transmitted modulated signals are received by $N_R$ antennas 1518a through 1518r and the received signal from each antenna 1518 is provided to a respective receiver (RCVR) 1520a through 1520r. Each receiver 1520 conditions (e.g., filters, amplifies, and down converts) a respective received signal, digitizes the conditioned signal to provide samples, and further processes the samples to provide a corresponding "received" symbol stream.

An RX data processor 1522 then receives and processes the $N_R$ received symbol streams from $N_R$ receivers 1520 based on a particular receiver processing technique to provide $N_T$ "detected" symbol streams. The RX data processor 1522 then demodulates, deinterleaves, and decodes each detected symbol stream to recover the traffic data for the data stream. The processing by RX data processor 1522 is complementary to that performed by TX MIMO processor 1512 and TX data processor 1508 at transmitter system 1502. A processor 1524 periodically determines which precoding matrix to use. Processor 1524 formulates a reverse link message comprising a matrix index portion and a rank value portion.

The reverse link message may comprise various types of information regarding the communication link and/or the received data stream. The reverse link message is then processed by a TX data processor 1526, which also receives traffic data for a number of data streams from a data source 1528, modulated by a modulator 1530, conditioned by transmitters 1520a through 1520r, and transmitted back to transmitter system 1502.

At transmitter system 1502, the modulated signals from receiver 1504 are received by antennas 1516, conditioned by receivers 1514, demodulated by a demodulator 1532, and processed by a RX data processor 1534 to extract the reserve link message transmitted by the receiver system 1504. Processor 1510 then determines which pre-coding matrix to use for determining the beamforming weights then processes the extracted message. Memory 1536 can be used to temporarily store some buffered/computational data from 1532 or 1534 through processor 1510, store some buffered data from 1506, or store some specific program codes. Further, memory 1538 may be used to temporarily store some buffered/computational data from 1522 through processor 1524, store some buffered data from 1528, or store some specific program codes.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects, concurrent channels may be established based on pulse repetition frequencies. In some aspects, concurrent channels may be established based on pulse position or offsets. In some aspects, concurrent channels may be established based on time hopping sequences. In some aspects, concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects, a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

Systems, methods and/or machine-readable storage media for facilitating a two-stage downlink control channel for 5G systems are provided herein. Legacy wireless systems such as LTE, Long-Term Evolution Advanced (LTE-A), High Speed Packet Access (HSPA) etc. use fixed modulation format for downlink control channels. Fixed modulation format implies that the downlink control channel format is always encoded with a single type of modulation (e.g., quadrature phase shift keying (QPSK)) and has a fixed code rate. Moreover, the forward error correction (FEC) encoder uses a single, fixed mother code rate of ⅓ with rate matching. This design does not take into the account channel statistics. For example, if the channel from the BS device to the mobile device is very good, the control channel cannot use this information to adjust the modulation, code rate, thereby unnecessarily allocating power on the control channel. Similarly, if the channel from the BS to the mobile device is poor, then there is a probability that the mobile device might not able to decode the information received with only the fixed modulation and code rate. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In summary, in exemplary embodiments, the present invention relates to a method and apparatus for uplink transmission for a user equipment (UE) (e.g. mobile phone) in a wireless communication system. Preferably, the UE is scheduled to perform a transmission for a channel on a scheduled resource and if the scheduled resource overlaps with a configured resource for the UE, the UE transmits on the non-overlapping portion of the scheduled resource at the UE's regular transmission power level and transmits on the overlapping portion of the scheduled resource at a lower transmission power level.

What is claimed is:

1. A method of performing a transmission, comprising:
receiving, by a user equipment (UE) comprising a processor, from a network, indication of a first resource via a physical control channel to schedule the UE to perform a channel transmission by using the first resource;
receiving, by the UE, indication of a second resource to configure the UE or another UE to perform a channel transmission by using the second resource, wherein the first resource includes a first portion that overlaps in a time domain and frequency domain with a portion of the second resource and includes a second portion that does not overlap in a time domain and frequency domain with a portion of the second resource;
performing, by the UE, the channel transmission to the network on the first portion of the first resource by using a first transmission power level; and
performing, by the UE, the channel transmission to the network on the second portion of the first resource by using a second transmission power level.

2. The method of claim 1, wherein the first transmission power level is smaller than the second transmission power level.

3. The method of claim 1, wherein the receiving indication of the second resource is performed via one of a broadcasted message, a radio resource control (RRC) configuration message, or a physical control channel.

4. The method of claim 1, wherein the first portion and the second portion are associated with one of the same transmission interval, the same scheduling interval, the same slot or the same mini-slot.

5. The method of claim 1, wherein the second resource is configured according to one of a unit associated with an orthogonal frequency-division multiplexing (OFDM) symbol or a unit associated with a mini-slot.

6. The method of claim 1, wherein the first transmission power level is one of fixed, configurable or programmable.

7. The method of claim 1, wherein the second transmission power level is one of a regular or a nominal power level associated with the UE, and wherein the second transmission power level is calculated according to one of a power control formula, a transmission bandwidth, a path loss or a power control command.

8. A method of performing a transmission, comprising:
receiving, by a user equipment (UE), information from a network indicating a configured resource in which the UE can perform a channel transmission at a reduced transmission power level compared to a regular transmission power level of the UE;
determining that a scheduled resource includes a first portion that overlaps in a time domain and frequency domain with the configured resource and includes a second portion that does not overlap in a time domain and frequency domain with the configured resource;
determining, by the UE, a channel transmission power level for the first portion of the scheduled resource based on the overlap in the time domain and frequency domain with the configured resource; and
performing, by the UE, a channel transmission on the first portion of the scheduled resource at the determined transmission power level.

9. The method of claim 8, further comprising:
determining, by the UE, a channel transmission power level for the second portion of the scheduled resource which does not overlap with the configured resource, wherein the determined channel transmission power level for the first portion is lower than the determined channel transmission power level for the second portion.

10. The method of claim 9, wherein the first portion includes first set of resource elements associated with an orthogonal frequency-division multiplexing (OFDM) symbol and the second portion includes a second set of resource elements associated with the OFDM symbol.

11. The method of claim 10, where the second set is transmitted at the regular transmission power level of the UE and the first set is transmitted at the reduced power level.

12. A non-transitory machine-readable medium, comprising executable instructions that, when executed by a processor, facilitate performance of operations, comprising:
receiving, from a network, indication of a first resource via a physical control channel to schedule a UE to perform a channel transmission by using a first resource;
receiving indication of a second resource to configure the UE or another UE to perform a channel transmission by using the second resource, wherein the first resource includes a first portion that overlaps in a time domain and frequency domain with a portion of the second resource and includes a second portion that does not overlap in a time domain and frequency domain with a portion of the second resource;
performing the channel transmission to the network on the first portion of the first resource by using a first transmission power level; and
performing the channel transmission to the network on the second portion of the first resource by using a second transmission power level.

13. The non-transitory machine-readable medium of claim 12, wherein the first transmission power level is smaller than the second transmission power level.

14. The non-transitory machine-readable medium of claim 12, wherein indication of the second resource is received via one of a broadcasted message, a radio resource control (RRC) configuration message, or a physical control channel.

* * * * *